(12) United States Patent
Van Weelden

(10) Patent No.: US 8,056,576 B2
(45) Date of Patent: Nov. 15, 2011

(54) DUAL SETPOINT PRESSURE CONTROLLED HYDRAULIC VALVE

(75) Inventor: Curtis Lee Van Weelden, Waukesha, WI (US)

(73) Assignee: HUSCO Automotive Holdings LLC, Waukesha, WI (US)

( * ) Notice: Subject to any disclaimer, the term of this patent is extended or adjusted under 35 U.S.C. 154(b) by 750 days.

(21) Appl. No.: 12/198,691

(22) Filed: Aug. 26, 2008

(65) Prior Publication Data

US 2009/0057583 A1 Mar. 5, 2009

Related U.S. Application Data

(60) Provisional application No. 60/968,090, filed on Aug. 27, 2007.

(51) Int. Cl.
*G05D 16/00* (2006.01)

(52) U.S. Cl. .......... 137/107; 137/102

(58) Field of Classification Search .......... 137/102, 137/107, 625.65, 625.34, 625.35; 251/129.02
See application file for complete search history.

(56) References Cited

U.S. PATENT DOCUMENTS

| | | | |
|---|---|---|---|
| 2,664,701 A * | 1/1954 | Sidney et al. .............. 60/39.094 |
| 2,670,751 A * | 3/1954 | Wilson .......................... 137/107 |
| 3,498,056 A * | 3/1970 | Avery ........................ 60/39.094 |
| 3,747,627 A * | 7/1973 | Christie ....................... 137/102 |
| 3,788,597 A | 1/1974 | Ichioka |
| 3,894,553 A * | 7/1975 | Exley ........................... 137/102 |
| 3,961,606 A * | 6/1976 | Wong ........................... 123/41.12 |
| 4,004,603 A * | 1/1977 | Jones ............................ 137/107 |
| 4,057,074 A * | 11/1977 | Fischer ......................... 137/107 |
| 4,127,835 A | 11/1978 | Knutson |
| 4,200,067 A | 4/1980 | Trenne |
| 4,206,728 A | 6/1980 | Trenne |
| 4,267,897 A | 5/1981 | Takeshima |
| 4,448,293 A * | 5/1984 | Maeda ........................... 192/3.3 |
| 4,476,823 A | 10/1984 | Williams |
| 4,525,695 A | 6/1985 | Sheng et al. |
| 4,635,671 A * | 1/1987 | Viegas ......................... 137/102 |
| 5,012,778 A | 5/1991 | Pitzi |
| 5,125,429 A * | 6/1992 | Ackroyd et al. .............. 137/218 |
| 5,191,867 A | 3/1993 | Glassey |
| 5,224,683 A | 7/1993 | Richeson |
| 5,231,959 A | 8/1993 | Smietana |
| 5,248,123 A | 9/1993 | Richeson et al. |
| 5,252,939 A | 10/1993 | Riefler et al. |
| 5,287,829 A | 2/1994 | Rose |
| 5,335,633 A | 8/1994 | Thien |
| 5,339,777 A | 8/1994 | Cannon |
| 5,392,749 A | 2/1995 | Stockner et al. |
| 5,410,994 A | 5/1995 | Schechter |
| 5,419,301 A | 5/1995 | Schechter |

(Continued)

*Primary Examiner* — John Rivell
*Assistant Examiner* — Minh Le
(74) *Attorney, Agent, or Firm* — Quarles & Brady LLP; George E. Haas

(57) ABSTRACT

A hydraulic valve has a valve body with a bore into which an inlet port, an outlet port, and a workport all open. A valve spool is slideably received within the bore. The valve spool has a first position that provides a path between the inlet port and the workport, and a second position that provides another path between the outlet port and the workport. Inlet port pressure tends to move the valve spool into the first position and outlet port pressure tends to move the valve spool into the second position. A linear actuator is coupled to the valve spool by a spring, thereby biasing the valve spool toward the first position. Another spring biases the valve spool toward the second position.

20 Claims, 2 Drawing Sheets

U.S. PATENT DOCUMENTS

| | | |
|---|---|---|
| 5,421,359 A | 6/1995 | Meister et al. |
| 5,448,973 A | 9/1995 | Meyer |
| 5,456,221 A | 10/1995 | Schechter |
| 5,456,222 A | 10/1995 | Schechter |
| 5,456,223 A | 10/1995 | Miller et al. |
| RE35,303 E * | 7/1996 | Miller et al. ............... 123/90.11 |
| 5,577,534 A * | 11/1996 | Ward ..................... 137/596.17 |
| 6,313,726 B1 | 11/2001 | Golovatai-Schmidt et al. |
| 6,640,834 B1 | 11/2003 | Hamkins et al. |
| 2005/0211317 A1* | 9/2005 | Kramer et al. ........... 137/625.65 |
| 2007/0209723 A1* | 9/2007 | Burrola et al. ........... 137/625.65 |

* cited by examiner

DUAL SETPOINT PRESSURE CONTROLLED HYDRAULIC VALVE

CROSS-REFERENCE TO RELATED APPLICATIONS

This application claims benefit of U.S. Provisional Patent Application No. 60/968,090 that was filed on Aug. 27, 2007.

STATEMENT REGARDING FEDERALLY SPONSORED RESEARCH OR DEVELOPMENT

Not Applicable

BACKGROUND OF THE INVENTION

1. Field of the Invention

The present invention relates to valve spool valves in which pressure applied to a port causes the position of the valve spool to change, thereby opening or closing a fluid path; and in particular to such valves that have two electrically selectable setpoints that vary a pressure threshold which must be exceeded for the valve spool to change position.

2. Description of the Related Art

Pressure operated valves are well known. Pressure occurring at a port of the valve applies a force to a valve element, such as a valve spool or poppet. Often that pressure force is opposed by a spring force, commonly referred to as the setpoint of the valve, which defines the pressure threshold that must be exceeded for the valve to operate. When the pressure force is greater than the spring force, the valve element moves from a first position to a second position. That movement opens or closes a fluid path through the valve. Thereafter, when the pressure force decreases below the spring force, the valve element returns to the first position.

Valves of this type are used to control application of fluid pressure to another hydraulically operated device in response to the level of the pressure applied to the valve. It is desirable in some applications to design a valve with two pressure setpoints that can be selected depending on operating conditions of the machine in which the hydraulic system is incorporated.

Solenoid operated valve spool valves also are well known for controlling the flow of hydraulic fluid. In a typical valve of this type, such as shown in U.S. Pat. No. 7,007,925, a solenoid actuator has an armature that moves in response to an electromagnetic field that is created by electric current flowing through a coil. The armature either directly engages or drives a pin that engages a valve spool. In response to the force imparted by the solenoid actuator, the valve spool slides within a bore into which a plurality of ports open. A typical valve of this type has three ports along the length of the bore, a supply port and a tank port with a workport in between that leads to a device being controlled by the hydraulic fluid flowing through the valve. A groove in the outer surface of the valve spool provides a path between the workport and either the supply port or the tank port depending upon the position of the valve spool within the bore. A spring biases the valve spool into a predefined position when the solenoid is de-energized.

Although the primary forces that cause the valve spool to move are produced by the solenoid actuator and the spring, it is not uncommon that surfaces of the valve spool are specifically designed so that fluid pressures acting thereon aid in moving the valve spool in one or both directions within the valve bore.

SUMMARY OF THE INVENTIONS

A hydraulic valve includes a valve body with a bore into which an inlet port, an outlet port, and a workport open. A valve spool is slideably received within the bore and selectively connects the inlet port and the outlet port to the workport in different positions of the valve spool in the bore. Pressure in the inlet port tends to move the valve spool in a first direction in the bore and pressure in the outlet port tends to move the valve spool in an opposite second direction.

A linear actuator is adjacent the valve body. A spring extends between the linear actuator and the valve spool, and biases the valve spool in one of the first and second directions. Another spring biases the valve spool in the other of the first and second directions.

In one embodiment of the hydraulic valve, the linear actuator has a solenoid coil assembly with a coil aperture formed therein, and has an armature assembly that is slideably received in the coil aperture. Preferably, the armature assembly comprises an armature that slides within the coil aperture, a push pin affixed to the armature, and a bushing engaged by the push pin. In that configuration, one end of the one spring abuts the bushing and another end of that spring abuts the valve spool.

In one embodiment, the valve spool has first land proximate a first end, a second land, and a first recessed section between the first and second lands. A second recessed section is between the second land and the second end.

DETAILED DESCRIPTION OF THE INVENTION

Figure 1:
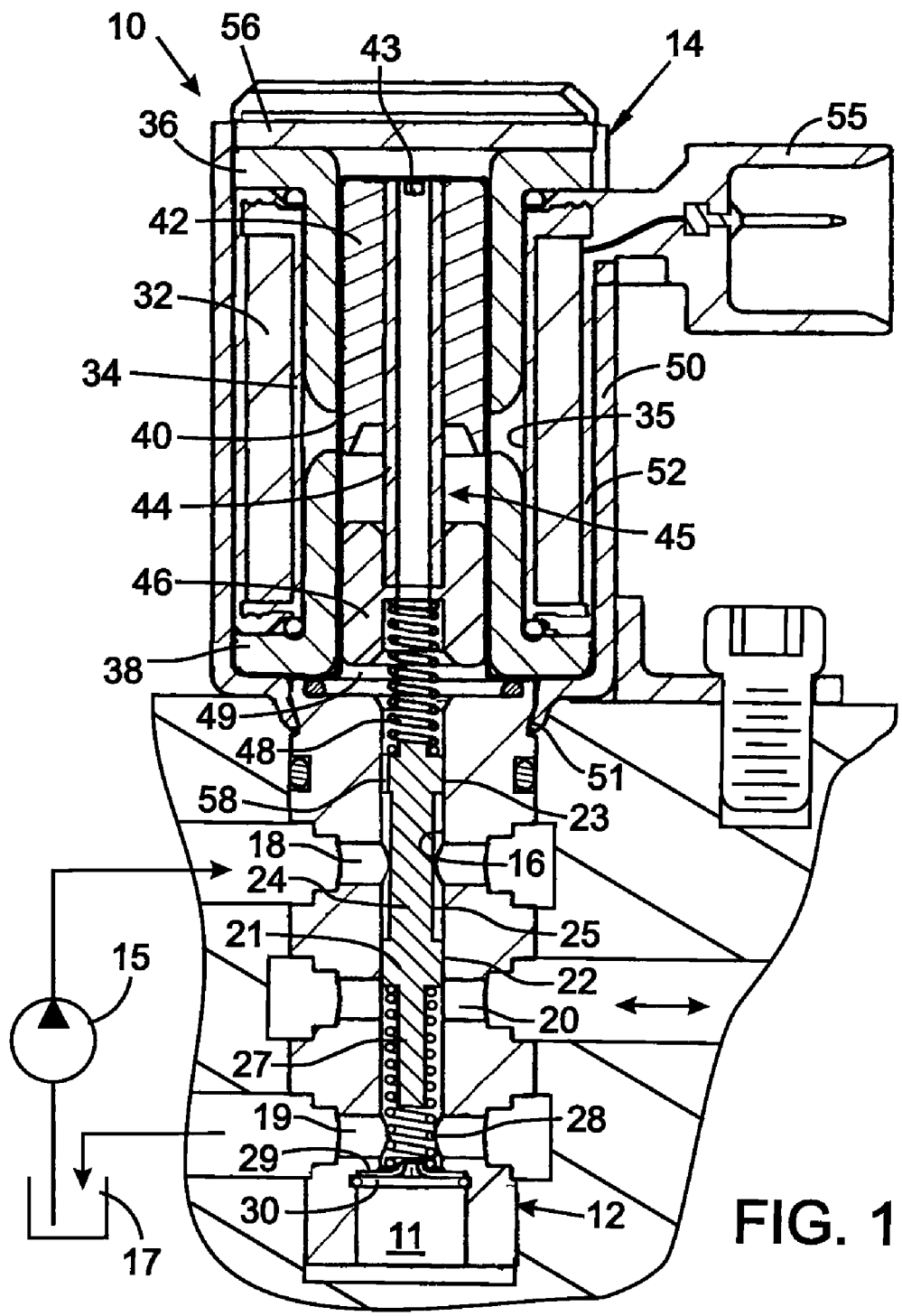
FIG. 1 is a longitudinal cross-sectional view through a hydraulic valve according to the present invention, wherein a solenoid actuator is deactivated.

With initial reference to the drawing, a hydraulic valve 10 has a valve body 12 to which a solenoid actuator 14 is attached. The body 12 has a valve bore 16 extending longitudinally there through with an inlet port 18, an outlet port 19, and a workport 20 opening into the valve bore. The workport 20 is located along the valve bore 16 between the inlet and outlet ports 18 and 19, respectively. The inlet port typically is connected to a source of pressurized fluid, such as the outlet of a pump 15, and the outlet port 19 is usually connected to a return line leading to the tank 17 of the hydraulic system. An opening 11 at the end of the valve bore 16 provides an alternative outlet port.

A valve spool 21 is slideably received within the valve bore 16. The valve spool 21 has a first land 22 near a first end and has a second land 23 with a first recessed section 24 between the first and second lands, thereby forming a groove 25 around the valve spool. A reduced diameter, second recessed section 27 extends between the second land 23 and a second end of the valve spool. A first spring 28 biases the valve spool 21 away from the bore opening 11. Specifically the first spring 28 engages the valve spool 21 adjacent the second end and abuts a disk-shaped spring perch 29 held within the valve bore by a snap ring 30. The first spring 28 forces the valve spool 21 toward the solenoid actuator 14. The first end of the valve spool 21 is near an end of the valve body 12 which is secured to the solenoid actuator 14.

The solenoid actuator 14 includes an electromagnetic coil 32 that is wound around a non-magnetic bobbin 34 which has a central opening 35. The solenoid actuator 14 also has two tubular pole pieces 36 and 38. An upper pole piece 36 extends into one end of the bobbin's central opening 35 and a lower pole piece 38, adjacent the valve body 12, extends into the other end of the central opening. The pole pieces 36 and 38 are spaced slightly apart from one another in the bobbin. An inverted, cup-shaped solenoid tube 40 extends into the two pole pieces 36 and 38 and has an open end facing the valve body 12 and a closed end within the upper pole piece 36. References herein to directional relationship and movement, such as upper and lower and up and down, refer to the relationship and movement of components in the orientation shown in the drawing, which may not be the orientation of those components when the valve is attached to a machine.

A ferromagnetic armature 42 is slideably received within the solenoid tube 40 and has a tubular push pin 44 secured within a central aperture through the armature. The push pin 44 has a notch 43 at its upper end to allow fluid to enter when that end abuts the closed end of the solenoid tube 40. The push pin 44 and the armature 42 move as a unit within the non-magnetic solenoid tube 40 in response to an electromagnetic field produced by electric current flowing through the coil 32. The tubular configuration of the push pin 44 allows hydraulic fluid to flow between opposite sides of the armature during that movement. The push pin 44 projects from the armature 42 toward the valve body 12 and has a remote end that engages and preferably is secured to a bushing 46. A second spring 48 extends between the bushing 46 and an adjacent end of the valve spool 21. Therefore, the second spring 48 tends to bias the valve spool 21 away from the solenoid actuator 14 and toward the end opening 11 of the valve bore 16. The armature 42, the push pin 44 and the bushing 46 form an armature assembly 45, however two or all three of those components could be fabricated from a single piece of material. Furthermore, that armature assembly 45 may have a different shape as long as it provides the same functionality, as will be described.

The components of the solenoid actuator 14 described thus far are enclosed in an exterior metal housing 50 that is crimped into a notch 51 around the valve body 12 to secure the solenoid actuator to that valve body. A plastic material is injected into the housing 50 to form an over-molded enclosure 52 that extends around the solenoid coil 32 and projects through an opening in the housing to form an external electrical connector 55 for the solenoid coil. A metal end plate 56 closes the end of the housing 50 that is remote from the valve body 12.

The valve 10 is adapted to be installed in a hydraulic system in which pressurized fluid from a source, such as the pump 15, is applied to the inlet port 18 and in which a return line to the system tank 17 is connected to the outlet port 19. The workport 20 is connected to a device that is being operated by the hydraulic fluid. FIG. 1 depicts the de-energized state of the hydraulic valve 10 when pressure at the inlet port 18 is relatively low, such as occurs prior to starting the pump. At that time, the first and second spring 28 and 48 apply equal and opposing forces that maintain the valve spool 21 centered between the spring perch 29 and the bushing 46, which is pushed upward by the combined spring forces. In this position, the groove 25 around the valve spool communicates with only the inlet port 18. However, the second recessed section 27 at the end of the valve spool adjacent to the first spring 28 provides a path for fluid to flow from the workport 20 to the outlet port 19, thereby releasing any pressure at the workport.

When the pump 15 is activated, the pressure at the inlet port 18 of the valve 10 begins increasing. That pressure is communicated past the upper end of the valve spool 21 through a notch 58, so that the same pressure exists in a cavity 49 between the valve spool and the bushing 46. When the pressure exceeds a first pressure threshold, the combined force from that pressure and the second spring 48 that is exerted on the upper end of the valve spool 21 is greater than the opposing force of the first spring 28, thereby resulting in downward movement of the valve spool 21 which compresses the first spring 28. Eventually the valve spool moves into a position at which the first land 22 on the valve spool closes communication between the workport 20 and the outlet port 19. Continued downward motion, in response to the inlet port pressure, moves the valve spool 21 into a position at which its annular groove 25 communicates with both the inlet port 18 and the workport 20, thereby providing a fluid path there between.

Thereafter, when pressure at the inlet port decreases significantly, the first spring 28 forces the spool 21 upward into the position illustrated in FIG. 1, at which the workport 20 again communicates with the outlet port 19.

Figure 2:
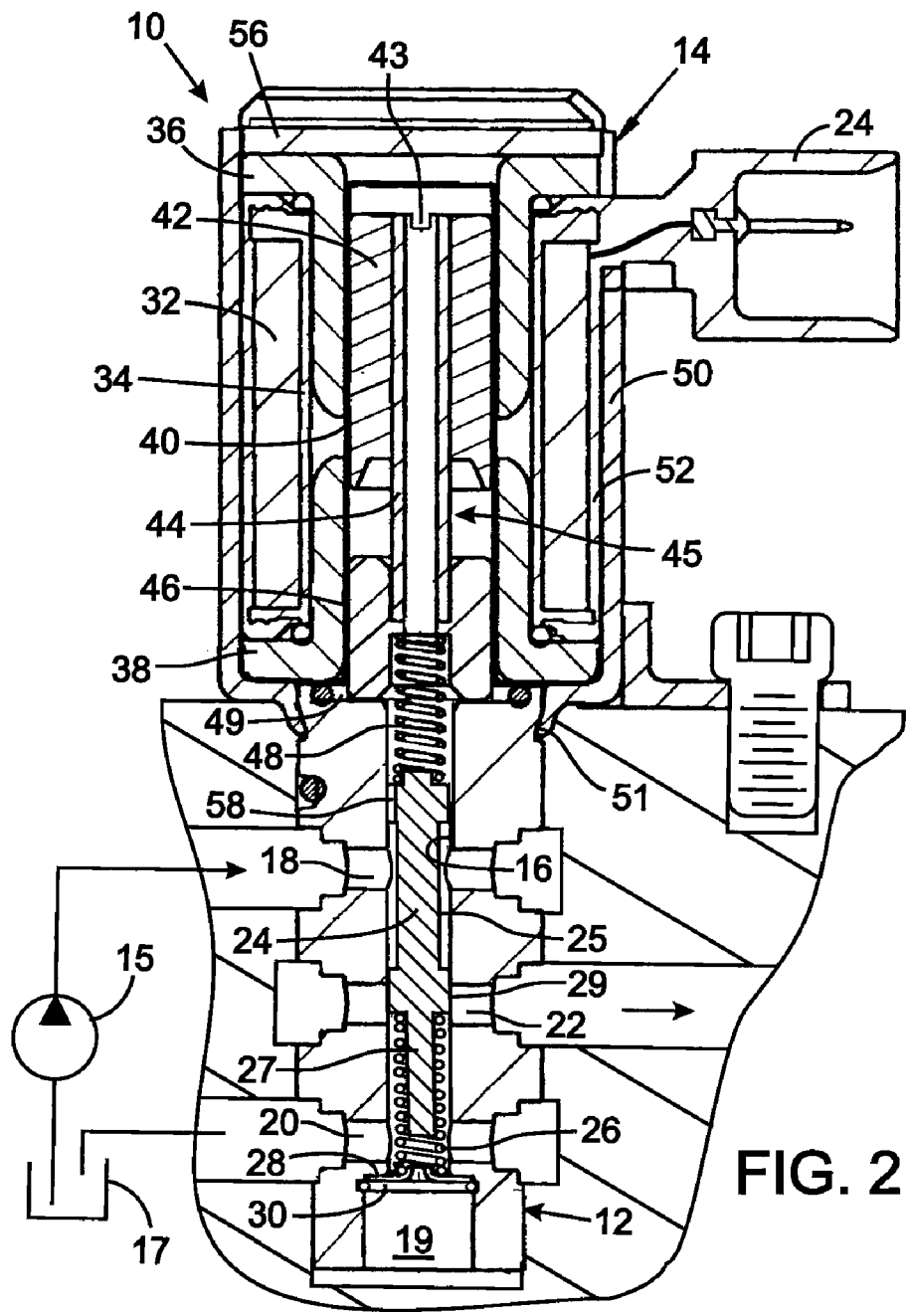
FIG. 2 is a similar cross-sectional view through the hydraulic valve with the solenoid actuator activated.

Alternately, when the solenoid coil 32 is energized by electric current, the resultant electromagnetic field causes the armature 42 to move downward within the solenoid tube 40 from the position illustrated in FIG. 1 into the position in FIG. 2. Because the armature 42 is coupled by the push pin 44 to the bushing 46, the bushing also moves downward until it strikes the upper end of the valve body 12 which limits the amount of bushing motion regardless of the force produced by the electromagnetic field. This action initially compresses the second spring 48, thereby exerting a greater force on the valve spool 21 than the force from the opposing first spring 28. The resultant force imbalance causes the valve spool 21 to move downward compressing the first spring 28. Upon the bushing 46 resting against the upper end of the valve body 12, the two springs 26 and 48 again reach a force equilibrium which positions the valve spool 21 in a more downward location than before the solenoid coil 32 was energized. In this new location, the workport 20 still is connected to the outlet port 19 by the path around the valve spool's second recessed section 27.

The downward shift of the valve spool 21, produced by energizing the solenoid actuator 14, compresses both the springs 26 and 48 a greater amount than when the solenoid is de-energized. The compression of the first spring 28, in particular, alters the magnitude of the pressure required at the inlet port 18 to move the valve spool into a position at which a path is created between the inlet port and the workport 20. The magnitude of pressure that needs to be applied to the inlet port for this action to occur (a second pressure threshold) is less than the first pressure threshold for creating this path when the solenoid actuator 14 is de-energized. That second pressure threshold is determined only by the stroke of the bushing 46 and the rate of the second spring 48, but is unaffected by the electromagnetic force which eliminates the need for accurate control of that force. Thus, by selectively energizing or de-energizing the solenoid actuator 14, the inlet pressure that is required to open communication between the inlet port 18 and the workport 20 is set at two different threshold levels. Selecting the particular threshold level alters the pressure response characteristic of the valve and likewise operation of the hydraulic device connected to the workport 20.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

The invention claimed is:

1. A hydraulic valve comprising:
   a valve body with a bore and having an inlet port, an outlet port and a workport in communication with the bore;
   a valve spool slideably received within the bore of the valve body and selectively connects the inlet port and the outlet port to the workport in different positions of the valve spool in the bore, wherein pressure in the inlet port tends to move the valve spool in a first direction in the bore and pressure in the outlet port tends to move the valve spool in an opposite second direction in the bore;
   a linear actuator adjacent the valve body;
   a first spring biasing the valve spool with respect to the valve body in one of the first and second directions; and
   a second spring extending between and coupling the linear actuator and the valve spool, and biasing the valve spool in another one of the first and second directions.

2. The hydraulic valve as recited in claim 1 wherein the linear actuator comprises a solenoid coil assembly with a coil aperture formed therein, and an armature assembly slideably received in the coil aperture.

3. The hydraulic valve as recited in claim 2 wherein one end of the second spring engages the armature assembly and another end of the first spring engages the valve spool.

4. The hydraulic valve as recited in claim 2 wherein the armature assembly comprises an armature slideably received in the coil aperture, a push pin affixed to the armature, and a bushing engaging the push pin.

5. The hydraulic valve as recited in claim 4 wherein one end of the second spring engages the bushing and another end of the second spring engages the valve spool.

6. The hydraulic valve as recited in claim 4 wherein forces produced by the second spring and pressure in the inlet port tend to move the valve spool in the first direction, and forces produced by the first spring and pressure in the outlet port tend to move the valve spool in the second direction.

7. The hydraulic valve as recited in claim 1 wherein movement of the valve spool in the first direction opens a path between the inlet port and the workport, and movement of the valve spool in the second direction opens another path between the outlet port and the workport.

8. The hydraulic valve as recited in claim 1 wherein activation and deactivation of the linear actuator varies an amount of pressure at the inlet port that is required to move the valve spool.

9. The hydraulic valve as recited in claim 1 wherein the valve spool has a first end, a second end, a first land proximate a first end, a second land, a first recessed section between the first land and the second land, and a second recessed section between the second land and the second end.

10. A hydraulic valve comprising:
    a valve body with a bore and having an inlet port, an outlet port and a workport in communication with the bore;
    a valve spool slideably received within the bore of the valve body and having a first position in which a path is provided between the inlet port and the workport and having a second position in which another path is provided between the outlet port and the workport, wherein pressure in the inlet port tends to move the valve spool into the first position and pressure in the outlet port tends to move the valve spool into the second position;
    a linear actuator adjacent the valve body;
    a first spring biasing the valve spool toward the second position; and
    a second spring extending between and coupling the linear actuator and the valve spool and biasing the valve spool toward the first position.

11. The hydraulic valve as recited in claim 10 wherein the linear actuator comprises a solenoid coil assembly with a coil aperture formed therein, and an armature assembly slideably received in the coil aperture.

12. The hydraulic valve as recited in claim 11 wherein one end of the second spring engages the armature assembly and another end of the second spring engages the valve spool.

13. The hydraulic valve as recited in claim 11 wherein the armature assembly comprises an armature slideably received in the coil aperture, a push pin affixed to the armature, and a bushing engaging the push pin.

14. The hydraulic valve as recited in claim 13 wherein one end of the second spring engages the bushing and another end of the second spring engages the valve spool.

15. The hydraulic valve as recited in claim 10 wherein activation and deactivation of the linear actuator varies an amount of pressure required to move the valve spool.

16. The hydraulic valve as recited in claim 10 wherein the valve spool has a first end, a second end, a first land proximate a first end, a second land, a first recessed section between the first land and the second land, and a second recessed section between the second land and the second end.

17. A hydraulic valve comprising:
    a valve body with a bore and having an inlet port, an outlet port and a workport in communication with the bore;
    a valve spool slideably received within the bore of the valve body and having a first position in which a path is provided between the inlet port and the workport and having a second position in which another path is provided between the outlet port and the workport, wherein pressure in the inlet port tends to move the valve spool into the first position and pressure in the outlet port tends to move the valve spool into the second position;
    an actuator having a solenoid coil assembly with a coil aperture formed therein, an armature slideably received in the coil aperture, a push pin affixed to the armature, and a bushing engaging the push pin;
    a first spring biasing the valve spool toward the second position; and
    a second spring extending between and engaging the bushing and the valve spool, and biasing the valve spool toward the first position.

18. The hydraulic valve as recited in claim 17 wherein one end of the second spring engages the bushing and another end of the second spring engages the valve spool.

19. The hydraulic valve as recited in claim 17 wherein the valve spool has a first end, a second end, a first land proximate a first end, a second land, a first recessed section between the first land and the second land, and a second recessed section between the second land and the second end.

20. The hydraulic valve as recited in claim 17 wherein activation and deactivation of the actuator varies an amount of pressure required to move the valve spool.

* * * * *